(12) United States Patent
Davis et al.

(10) Patent No.: US 7,711,781 B2
(45) Date of Patent: May 4, 2010

(54) TECHNIQUE FOR DETECTING AND BLOCKING UNWANTED INSTANT MESSAGES

(75) Inventors: John F. Davis, Durham, NC (US); Kevin D. Himberger, Durham, NC (US); Clark D. Jeffries, Durham, NC (US); Mohammad Peyravian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 10/984,299

(22) Filed: Nov. 9, 2004

(65) Prior Publication Data
US 2006/0101021 A1 May 11, 2006

(51) Int. Cl.
*G06F 15/16* (2006.01)

(52) U.S. Cl. .................. 709/206; 707/758; 707/922; 709/207; 705/14

(58) Field of Classification Search .......... 709/206, 709/207, 224, 225, 204, 203; 707/3; 705/3, 705/14; 713/201; 726/4
See application file for complete search history.

(56) References Cited

U.S. PATENT DOCUMENTS

| | | | |
|---|---|---|---|
| 6,725,269 B1 * | 4/2004 | Megiddo | 709/228 |
| 6,907,447 B1 * | 6/2005 | Cooperman et al. | 709/203 |
| 7,051,077 B2 * | 5/2006 | Lin | 709/207 |
| 7,191,213 B1 * | 3/2007 | Bouchard et al. | 709/204 |
| 7,206,814 B2 * | 4/2007 | Kirsch | 709/206 |
| 7,219,148 B2 * | 5/2007 | Rounthwaite et al. | 709/224 |
| 7,272,853 B2 * | 9/2007 | Goodman et al. | 726/13 |
| 7,287,060 B1 * | 10/2007 | McCown et al. | 709/206 |
| 7,299,261 B1 * | 11/2007 | Oliver et al. | 709/206 |
| 7,366,761 B2 * | 4/2008 | Murray et al. | 709/206 |
| 7,373,385 B2 * | 5/2008 | Prakash | 709/206 |
| 7,406,502 B1 * | 7/2008 | Oliver et al. | 709/206 |

(Continued)

FOREIGN PATENT DOCUMENTS

JP 2003-143182 5/2003

(Continued)

OTHER PUBLICATIONS

Zhijun Liu et al., Detecting and Filtering Instant Messaging Spam- A Global and Personalized Approach, 2005, pp. 1-6.*

(Continued)

*Primary Examiner*—John R. Cottingham
*Assistant Examiner*—Sherief Badawi
(74) *Attorney, Agent, or Firm*—Arthur J. Samodovitz (57) ABSTRACT

A technique for tracking one or more thresholds relating to the blocking of a particular screen name used on an IM system is disclosed. If the number of people who have blocked a particular screen name reaches a threshold amount, a determination is made that the screen name is being used by a spimmer or other bothersome person, and disciplinary action can be taken. In a preferred embodiment, the email address associated with a user name of a suspected spimmer is identified and all screen names associated with that email address are also subjected to disciplinary action, if desired. Thus, an IM company can suspend all screen names of a spimmer that are tied to the same email address, even though not all (or even none) of the screen names individually have reached a threshold level for discipline/suspension.

9 Claims, 6 Drawing Sheets

U.S. PATENT DOCUMENTS

| | | | |
|---|---|---|---|
| 7,409,708 B2 * | 8/2008 | Goodman et al. | 726/13 |
| 7,458,098 B2 * | 11/2008 | Judge et al. | 726/23 |
| 7,464,264 B2 * | 12/2008 | Goodman et al. | 713/154 |
| 7,467,409 B2 * | 12/2008 | Reasor et al. | 726/22 |
| 7,483,947 B2 * | 1/2009 | Starbuck et al. | 709/206 |
| 7,519,668 B2 * | 4/2009 | Goodman et al. | 709/206 |
| 7,519,994 B2 * | 4/2009 | Judge et al. | 726/22 |
| 2003/0216962 A1 * | 11/2003 | Heller et al. | 705/14 |
| 2004/0054741 A1 | 3/2004 | Weatherby et al. | 709/206 |
| 2004/0054887 A1 * | 3/2004 | Paulsen et al. | 713/154 |
| 2004/0093384 A1 * | 5/2004 | Shipp | 709/206 |
| 2004/0143633 A1 * | 7/2004 | McCarty | 709/206 |
| 2004/0177120 A1 * | 9/2004 | Kirsch | 709/206 |
| 2004/0199597 A1 * | 10/2004 | Libbey et al. | 709/207 |
| 2004/0210640 A1 * | 10/2004 | Chadwick et al. | 709/207 |
| 2005/0041789 A1 * | 2/2005 | Warren-Smith et al. | 379/93.24 |
| 2005/0044155 A1 * | 2/2005 | Kaminski et al. | 709/206 |
| 2005/0055416 A1 * | 3/2005 | Heikes et al. | 709/207 |
| 2005/0071435 A1 * | 3/2005 | Karstens | 709/207 |
| 2005/0076241 A1 * | 4/2005 | Appelman | 713/201 |
| 2005/0097179 A1 * | 5/2005 | Orme | 709/207 |
| 2005/0188045 A1 * | 8/2005 | Katsikas | 709/206 |
| 2006/0047769 A1 * | 3/2006 | Davis et al. | 709/207 |
| 2006/0075030 A1 * | 4/2006 | van Riel | 709/206 |
| 2006/0168009 A1 * | 7/2006 | Lyle et al. | 709/206 |

FOREIGN PATENT DOCUMENTS

| | | |
|---|---|---|
| JP | 2003-234784 | 8/2003 |
| KR | 2003074122 | 9/2003 |
| WO | WO 02/01823 | 1/2002 |

OTHER PUBLICATIONS

"Zone Labs: Home/Office Products," http://www.zonelabs.com/store/content/catalog/products..., (May 4, 2004).

"Info World: Zone Labs moves to secure instant messaging," http://www.infoworld.com/article/03/08/11/HNzoneim_1... (May 4, 2004).

"USENIX Annual Technical Conference 2003, FREENIX," http://www.usenix.org/events/usenix03/tech/freenix03/pa... (May 4, 2004).

"The Word Spy—spim," http://www.wordspy.com/words/spim.asp (Feb. 18, 2004).

"FaceTime Releases IM Auditor 4.5 for IM Spam or 'Spim' Control and Anti-Tampering," http://biz.yahoo.com/prnews/040127/sftu060_1.html, (Jan. 27, 2004).

Paganini, M., "ASK: Active Spam Killer," *FREENIX Track of the 2003 Annual Usenix Conference*, pp. 1-12 (2003).

* cited by examiner

| Name | Email Address | Screen Name | Blocked Screen Names |
|---|---|---|---|
| User A | UserA@host.com | User A | None |
| Spimmer | Spimmer1@host.com | Spimmer 1 | None |
| User B | UserB@host.com | User B | None |
| User C | UserC@host.com | User C | None |
| Spimmer | Spimmer1@host.com | Spimmer 2 | None |
| User D | UserD@host.com | User D | None |
| Spimmer | Spimmer1@host.com | Spimmer 3 | None |
| User E | UserE@host.com | User E | None |

| Name | Email Address | Screen Name | Blocked Screen Names |
|---|---|---|---|
| User A | UserA@host.com | User A | None |
| Spimmer | Spimmer1@host.com | Spimmer 1 | None |
| User B | UserB@host.com | User B | Spimmer 2 |
| User C | UserC@host.com | User C | None |
| Spimmer | Spimmer1@host.com | Spimmer 2 | None |
| User D | UserD@host.com | User D | Spimmer 3 |
| Spimmer | Spimmer1@host.com | Spimmer 3 | None |
| User E | UserE@host.com | User E | None |

TECHNIQUE FOR DETECTING AND BLOCKING UNWANTED INSTANT MESSAGES

BACKGROUND OF THE INVENTION

1. Field of the Invention

This invention relates to the field of instant messaging systems.

2. Description of the Related Art

Email is currently one of the most pervasive methods of communication in the world. Used for business or pleasure, email has revolutionized how companies do business and how friends stay in touch. Unfortunately, with the good also comes the bad. Electronic junk mail, known as "spam" is a term used to describe unsolicited and possibly illicit material coming from an unknown sender. The problem of spam is of such magnitude that federal legislation has been proposed and/or adopted to try to combat spam.

Another form of electronic communication, instant messaging ("IM") is following in the steps of email as a major form of electronic communication, both for business or pleasure. Spammers of course, have moved into IM as another source of contacts to whom they can send unsolicited spam. The process of spamming through an instant messaging system has been dubbed "spimming" by, among others, Information Week Magazine. Like spam, spim is annoying to, and may even cost, IM users.

To utilize spim, a spimmer must establish a "screen name" (SN) for the system on which they intend to send spim. The current practice of instant messaging companies when setting up a screen name for a user involves the gathering of limited information, typically only a name and email address. All of the information provided by the potential user can be invalid (fake), except for the email address. The email address given must be valid because a temporary password is mailed to the given email address. The following scenario is typical:

1. Spimmer obtains an email address from an ISP or another company providing free, web-based email accounts (e.g., Hotmail, Yahoo, etc.).

2. Using the email address, the spimmer requests an IM screen name from the IM Provider (possibly the same vendor as the ISP, e.g., Yahoo).

3. The IM Provider approves the requested screen name and sends a default password to the spimmer at the email address provided during the registration process.

4. The spimmer starts sending unsolicited mass IM messages (spim) using the new screen name.

All major IM companies give users of their system the ability to block messages coming from unknown senders or specific senders designated by the user. The user may select an option whereby any messages from a screen name not contained in the user's "Buddy List" (a list of screen names with whom the user corresponds) will be automatically blocked, or authorization may be requested before the message is accepted. In addition, most IM companies allow the user to designate specific screen names and place them in an "excluded list". Messages from screen names in the excluded list will be blocked unless they are removed from the excluded list.

A problem with this approach to blocking unwanted instant messages is that, in view of the simple manner in which screen names are obtainable, spimmers can and do have multiple screen names used for spimming. Thus, an IM user who blocks a particular screen name and any messages coming therefrom is still subject to attack by the same spimmer using a different screen name. This method requires that the user constantly update his or her list of excluded screen names as they occur. This is time consuming and annoying for IM users and is a significant problem.

SUMMARY OF THE INVENTION

The present invention is a system, method, and computer program product for tracking one or more thresholds relating to the blocking of a particular screen name used on an IM system. If the number of people who have blocked a particular screen name reaches a threshold amount, a determination is made that the screen name is being used by a spimmer or other bothersome person, and that screen name can be suspended pending investigation, or other disciplinary action as deemed appropriate can be taken. Numerous other thresholds may be utilized, including but not limited to, the number of blockages over a certain period of time.

In a preferred embodiment, the email address associated with a user name of a suspected spimmer is identified and all screen names associated with that email address are also subjected to disciplinary action, if desired. Thus, an IM company can suspend all screen names of a spimmer that are tied to the same email address, even though not all (or even none) of the screen names individually have reached a threshold level for discipline/suspension.

DETAILED DESCRIPTION OF THE PREFERRED EMBODIMENTS

Figure 1:
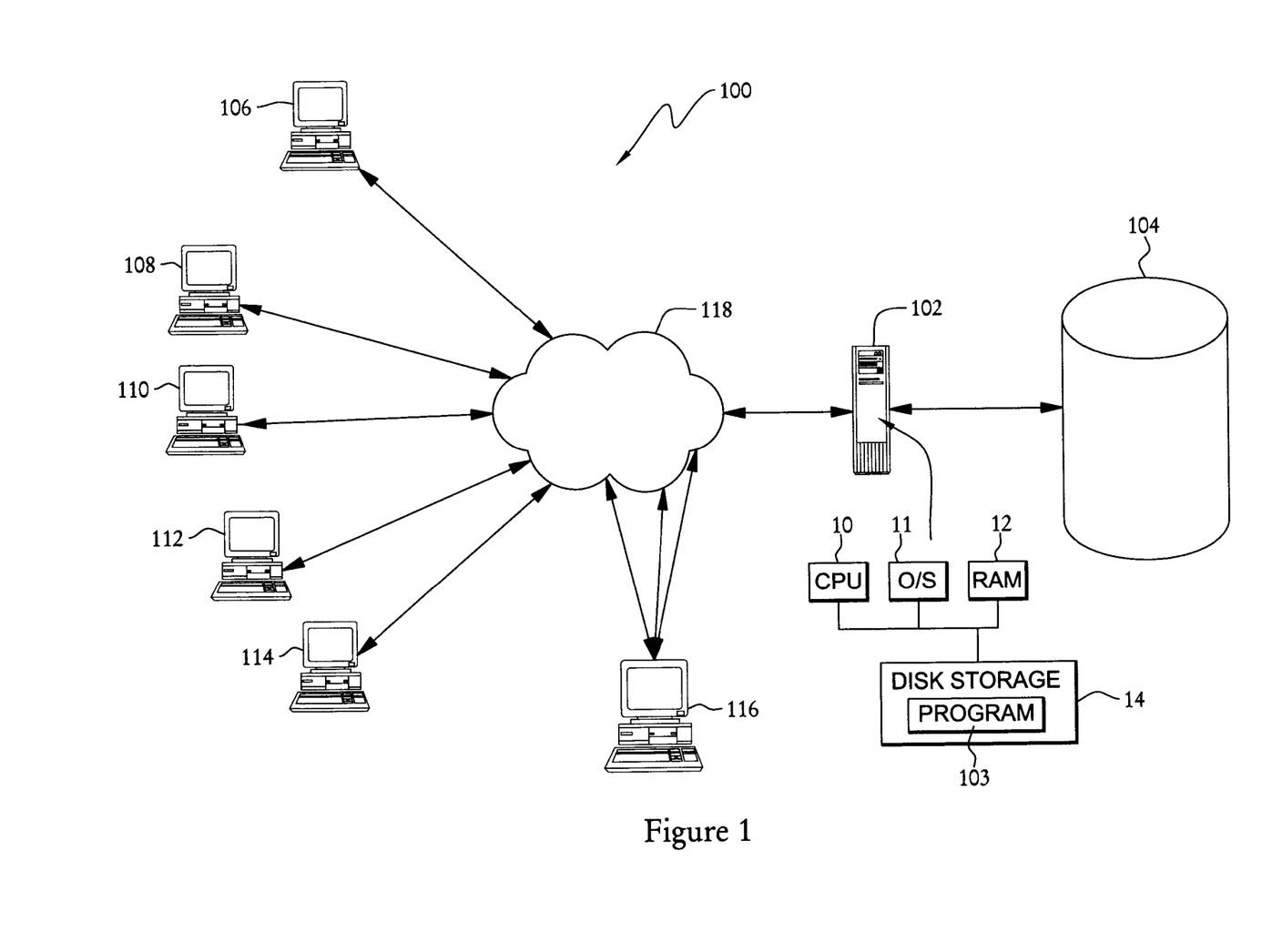
FIG. 1 is a block diagram illustrating the operation of a typical instant messaging system.

FIG. 1 is a block diagram illustrating the operation of a typical instant messaging system 100. An instant messaging server (IM server) 102 is coupled to a database 104 in which are stored data used by the IM server, including all of the user data related to users of the IM system IM includes a CPU 10, operating system 11, random access memory 12 and hard disk storage 14. Software program 103 is stored in hard disk storage 14 for execution by CPU 10 via computer readable memory 12.

A plurality of workstations 106, 108, 110, 112, 114, and 116 are couplable to the IM server 102 via a network 118 such as the Internet. Workstation 116 is illustrated as having multiple connections (three in this example) to the network 118. This signifies a single user having multiple screen names for use on an IM system. In a well known manner, a user of workstation 106 (for example) can prepare, using an IM client, an instant message for delivery to a user using, for example, workstation 112.

The user creates the instant message by identifying the user of workstation 112 using a screen name that the user of workstation 112 has registered with the instant message system. The user of workstation 106 then sends the message to the IM server 102 via the network 118. IM server 102 accesses the database 104, correlates the screen name to which the message is directed with a particular user and directs the message back over the network 118 to that user.

In this example, the user whose screen name is associated with this message is signed on to workstation 112; thus, the IM server 102 delivers the instant message to the user, via a client program on workstation 112, and the message is displayed at that workstation. The operation of a system such as the one illustrated in FIG. 1 is well known in the art and is not described in more detail herein.

Figure 2:
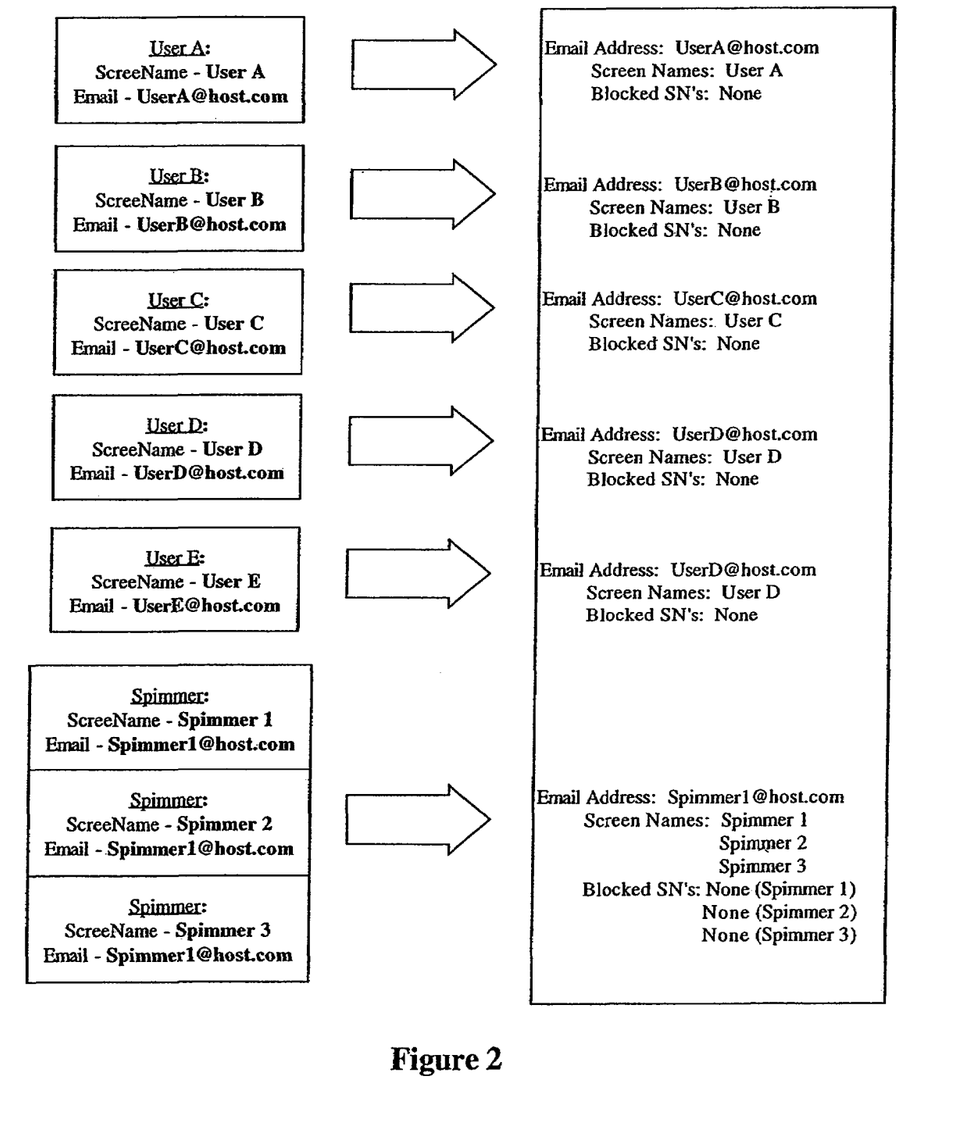
FIGS. 2 and 3 illustrate the method by which users of an IM system register names for use on the system and how this registration information is stored by the IM server.
Figure 3:
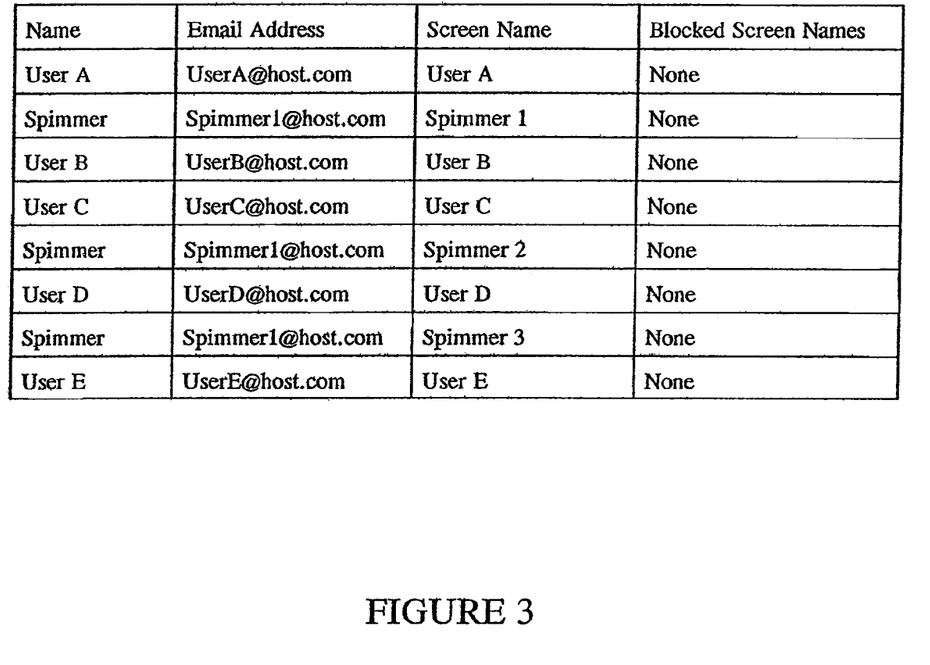

FIGS. 2 and 3 illustrate the method by which users of IM system 100 register names for use on the system and how this registration information is stored by IM server 102.

Referring to FIG. 2, user A, in this example using workstation 106, submits to IM server 102 a screen name ("User A"), a given name associated with that screen name ("User A") and an email address ("UserA@host.com") that is associated with this screen name and the given name. It is understood that the given name can be a pseudonym or other false name; the only portion of the registration information that must be accurate, for verification purposes, is the email address. The operator of IM system 100 will mail password information to the email address associated with the registration and if the email address is invalid, the screen name will not be registered with the system.

A second user, with a given name User B, registers the screen name User B with the email address UserB@host.com; a third user with a given name User C registers the screen name User C at email address UserC@host.com; a fourth user with a given name User D registers the screen name User D at email address UserD@host.com and a fifth user with a given name User E registers the screen name User E at email address UserE@host.com.

In addition, FIG. 2 shows how a spimmer (or anyone) can register multiple screen names on the same IM system 100. As shown in FIG. 2, a user with the given name "Spimmer" registers the screen name "Spimmer 1" associated with email address Spimmer1@host.com, and also registers screen names Spimmer 2 and Spimmer 3 with the same email address, Spimmer1@host.com. Although shown in FIG. 2 as using the same given name ("Spimmer") for all three screen names, it is understood that, since the given name is not verified, different given names could be used for these registrations.

FIG. 3 illustrates an example of how the registration information might be stored in database 104. The information illustrated in FIG. 3 is simply a series of fields of a database, whereby the given name, screen name, and email addresses are placed in appropriate fields so that they may be correlated in a relational database as is well known. Thus, for each of the registrations illustrated in FIG. 2, there are relational database entries entered into and stored in the database 104.

Also shown in both FIGS. 2 and 3 is an entry location for "Blocked Screen Names". In a typical registration process, a new user of the system will be unlikely to enter any blocked screen names upon initial registration. Typically, as the user uses the system, they encounter instant messages coming from screen names that are unknown to them and that may be undesirable. Thus, as the user uses the system, they may designate these undesirable instant messages and the screen names associated therewith as screen names that they wish to have blocked. However, the blocked screen name field is illustrated in FIGS. 2 and 3 because there is no reason why, upon initial registration, a user cannot also immediately designate blocked screen names if desired. As shown in examples of FIGS. 2 and 3, none of the users have blocked screen names at this point.

Figure 4:
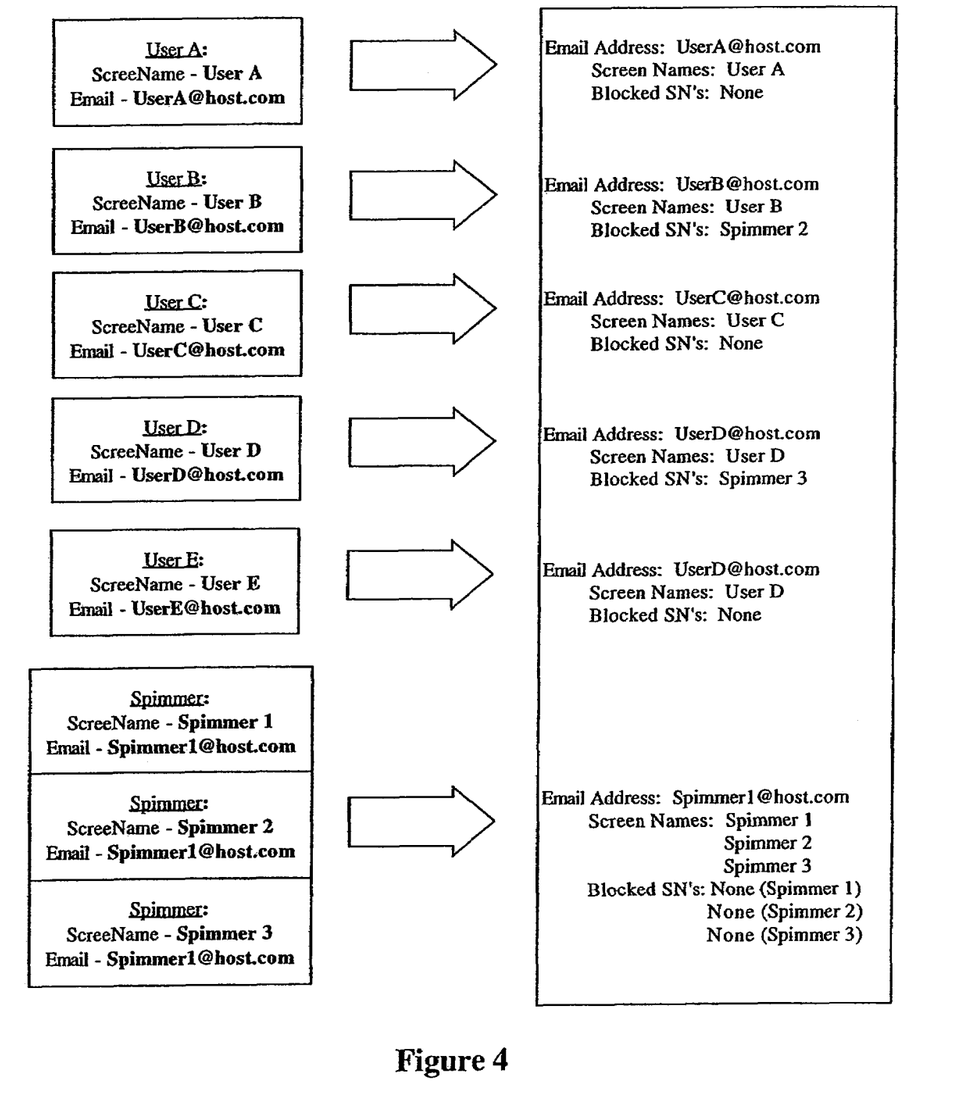
FIGS. 4 and 5 illustrate an example where two of the users have designated certain screen names as being blocked.
Figure 5:
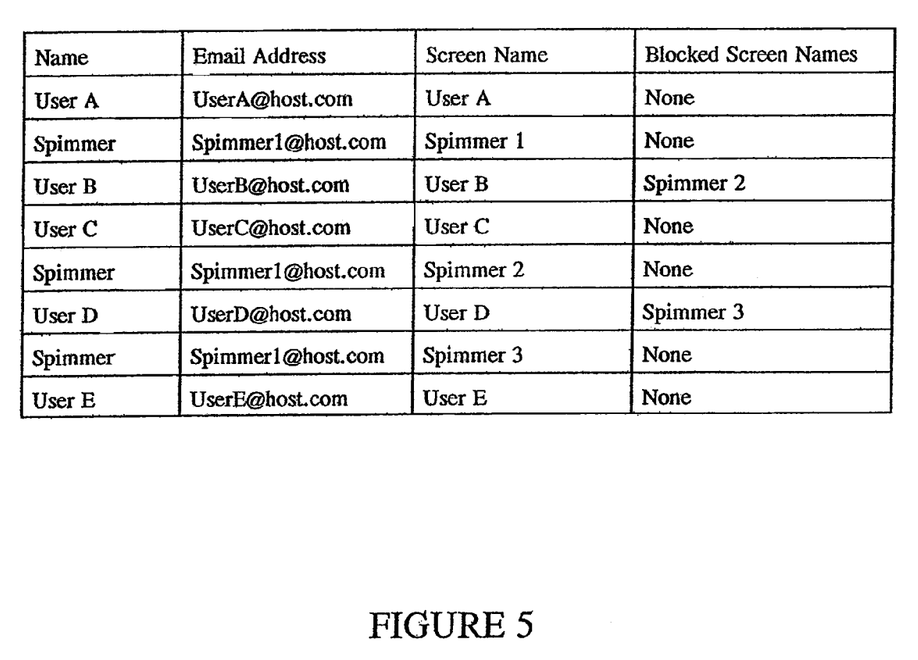

FIGS. 4 and 5 illustrate an example where two of the users have designated certain screen names as being blocked. Specifically, referring to FIG. 4, User B has designated "Spimmer 2" as a blocked screen name, and User D has designated "Spimmer 3" as a blocked screen name. This information is stored in the relational database in the appropriate field as shown in FIG. 5, so that the instant message system knows to block any messages coming from Spimmer 2 that are directed to User B, and any messages that are directed to User D from user name Spimmer 3.

In the example illustrated in the figures, there are a total of eight screen names being used on the system. Obviously in a real system, the number of users would be in the thousands or millions rather than such a small number, but the small number is used herein for purposes of example only.

In the example illustrated in FIGS. 4 and 5, 12.5% (one out of eight) screen names have blocked messages from Spimmer 2, and 12.5% (one out of eight) screen names have blocked messages from Spimmer 3.

In accordance with the present invention, a threshold number is set which would indicate an acceptable or unacceptable level of blockages with respect to a particular screen name. In other words, the system operator might decide that if 25% or more of users of the system have blocked a particular screen name, this indicates a potential spimmer, and investigative measures can be taken, or even disciplinary action can be taken. If we assume for this example that a threshold level of 25% blockages for a particular screen name must be met before a screen name is considered to be that of a spimmer, then in the example of FIG. 4, no screen names have yet met that threshold.

By simply tracking the number of screen names that have blocked a particular screen name, and taking some action when a threshold number of users have blocked a particular screen name, the present invention can help identify spimmers and take steps to prevent them from further use of the IM system.

In a preferred embodiment, the power available due to the use of the relational database can be brought to bear to identify a spimmer who is making use of multiple screen names to avoid detection. For example, in the illustration of FIGS. 4 and 5, as noted above, only 12.5% of the screen names have blocked Spimmer 2 and only 12.5% have blocked Spimmer 3. If either Spimmer 2 or Spimmer 3 are blocked by another user, the 25% threshold is met. However, if, using the relational database in which the registration information is stored, the system operator identifies blockages of any screen names associated with a single email address (rather than blockages associated with a single screen name), the blockage by User B of Spimmer 2, and the blockage by User D of Spimmer 3, will each point to the same email address, Spimmer1@host.com. This will identify that 25% (two out of eight) of the users of the system have blocked instant messages coming from a screen name associated with Spimmer1@host.com. If this is used for the threshold measurement, the system of the present invention will identify all screen names associated with Spimmer1@host.com as being those of a spimmer, and if desired, all instant messages coming from any screen names associated with Spimmer1@host.com (including presently unblocked "Spimmer 1") can be blocked and investigation or punitive measures taken.

The above example is an extremely simplified example used for the purpose of explanation. The above example simply looks for the reaching of a threshold percentage of blockages with respect to an email address, and then based on the meeting of that threshold, identifies all user names associated with the email address as being user names of a spimmer. However, limiting the threshold to a single threshold comprising the cumulative number of blockages may lead to an inaccurate portrayal of a user name as that of a spimmer. Accordingly, multiple thresholds may be combined to provide more resolution in identifying spimmers. For example, a time threshold may be combined with a number-of-blockages threshold so that in order for a user name and/or email address to be associated with a potential spimmer, the blockages must occur within a predetermined time frame or they will not necessarily be used to identify the user name and/or email address as that of a spimmer. In other words, this establishes a "rate of blockage" threshold that must be met.

A system operator could decide that if a predetermined number/percentage of users block a particular screen name within a 10 second (or any desired time interval) window, the screen name being blocked should be flagged as a potential spimmer. Another threshold possibility could be the amount of outbound traffic sent by a particular user name or by user names associated with the same email address. It does not have to be a requirement that a certain number of the outgoing messages be blocked; rather, the sending of a predetermined number of IM's within a predetermined time interval can be considered suspicious activity warranting that the user sending them be monitored for additional potential spimming behavior. If within a predetermined time interval form the mass IMing a certain percentage of the recipients block that user, this can be a threshold that triggers mitigating steps be taken against the user sending the Ims. Numerous other examples of threshold values and threshold combinations will be apparent to a designer of the system.

Figure 6:
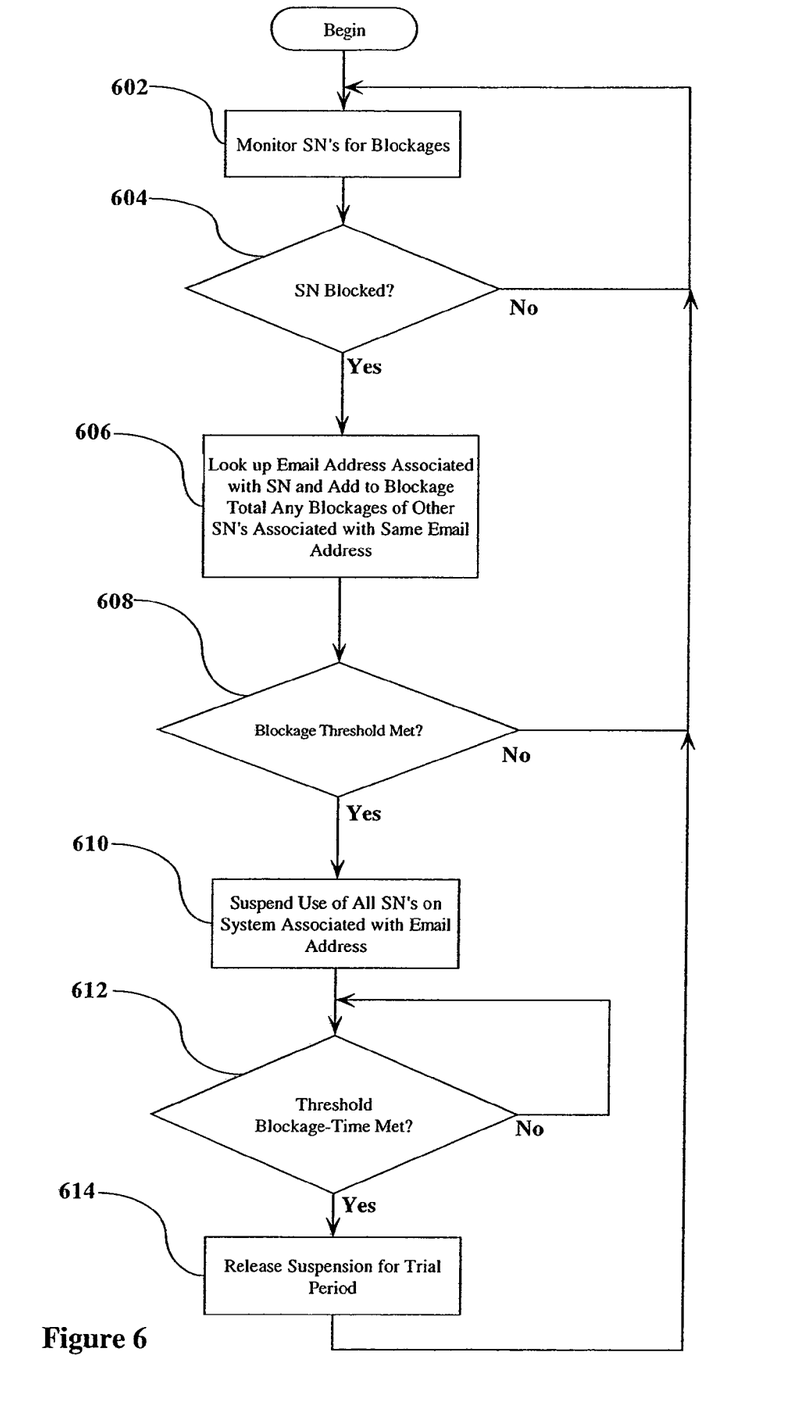
FIG. 6 is a flowchart illustrating the basic process/method of the present invention.

FIG. 6 is a flowchart illustrating the basic process/method of the present invention. Referring to FIG. 6, when the process begins, the screen names registered with a particular instant messaging system are monitored for blockage instances. Each time a blockage occurs, a "blockage total" for the particular screen name is incremented. Thus, at step 604, if a screen name has been blocked, the total blockage count for that screen name is incremented, and then the process proceeds to step 606 to determine if there are any other screen names associated with the email address for that screen name, and if there are any blockages for those other screen names, then those blockage totals are added to the blockage total of the first screen name. At step 608, a determination is made as to whether or not the blockage threshold has been met. If the blockage threshold has not been met, the process proceeds back to step 602 to monitor for additional screen name blockages.

If, however, at step 608 it is determined that the blockage threshold has been met, then at step 610, the use of all screen names associated with that email address are suspended. At step 612, a determination is made as to whether or not a threshold blockage-time has been met. This is simply a predetermined time period for which the screen names will be blocked. This step is optional, and if desired, the screen names can be blocked permanently. However, it is anticipated that at least once the user of the screen names will be given the opportunity to stop sending messages that result in blockages.

If at step 612, the threshold blockage time has not been met, the process loops around and waits until the blockage time threshold has been met. Once the blockage time threshold has been met, the process proceeds to step 614, where the screen names are released from suspension. The process then goes back to step 602 where the screen names are monitored for blockages.

Numerous options are available with respect to the steps illustrated in FIG. 6. For example, it is not required that, at step 606, other user screen names be identified; if a certain number of blockages are identified for a single screen name, the suspension can occur without correlating that screen name to other screen names via the email address.

A "leaky bucket" approach may also be utilized. For example, once a threshold is set (e.g., a total number of blockages), a counter is set to correspond to the threshold number and is decremented each time a blockage occurs. Once the counter reaches zero (i.e., the "bucket" is empty), it can be assumed that a spimmer (or a person sending unwanted messages) is using the user name. If desired, time can be factored in, by, for example, incrementing the counter by one count after a period of time has elapsed without a blockage.

Further, if desired, at step 614, when the threshold blockage time has been met and the suspension is released, if desired, the suspension period can be released for a predetermined trial period. If that trial period elapses without further blockages, the user can, for example, have their screen names unsuspended; however, if additional screen name blockages occur before the trial period ends, the screen names can be blocked permanently, or for an additional trial period or for additional trial periods.

Using the steps of FIG. 6, the present invention can be implemented. It is understood that the steps in FIG. 6 are illustrated for the purpose of example only.

In a preferred embodiment, spimmers can be automatically warned and/or disciplined. In other words, upon reaching a predetermined threshold, the system may block all IMs associated with the offending email address. A first "offense" might result in a one-hour blockage, a second offense might result in a 10-hour suspension, etc. Any disciplining pattern may be utilized and fall within the scope of the present invention. An IM company may block a suspected spimmer for a finite time period, then remove the block to determine whether the behavior persists. In the case of persistent spimmer behavior, the IM company could then reapply the block for a longer time period. This policy may avoid mistaken permanent blocking that may cause administrative difficulties.

This approach gives the advantage of allowing an IM company to block an unwanted person on their network. This is much preferable to the current solution of everyone on the network blocking the unwanted person on an individual basis.

Use of the present invention also gives rise to a method for confirming the identification of a spimmer. Spammers send bulk email from an address, frequently from a robotic, non-human sender (known as a "bot"), and never check or respond to any replies. Spimmers also use the same method, that is, they send numerous robotically created IMs without replying to any replies that are returned. They don't want to deal with the hundreds of messages saying "go away" or "leave me alone" or "who are you?" Therefore, all incoming messages are ignored by a spimmer.

This fact can be used to confirm that a suspected spimmer is indeed a spimmer. Once an IM is received by a receiving party, a random word can be automatically sent back to the sending screen name, transparently to the receiving party, if desired. This word is followed with a request to repeat the word in a reply IM to ensure spimming is not occurring. A spimmer and/or spimming but will not view the return IM and will not respond with verification. It is then known that the IM is an illegitimate IM and the screen name can be added to the block list.

The above-described steps can be implemented using standard well-known programming techniques. The novelty of the above-described embodiment lies not in the specific programming techniques but in the use of the steps described to achieve the described results. Software programming code 103 which embodies the present invention is typically stored in permanent storage of some type, such as permanent storage of a device on which an IM client is running. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a device on which an IM client is running. In a client/server environment, such software programming code may be stored with storage associated with a server. The software programming code may comprise a computer program product embodied in any of a variety of known computer-readable media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method for blocking first, second and third different screen names, correlated to a same e-mail address, from sending subsequent instant messages via an instant messaging server system, the method comprising the steps of: the instant messaging server system receiving first, second and third instant messages from the first, second and third screen names addressed to first, second and third respective users of the instant messaging server system; the instant messaging server system receiving a first blocking request from the first user to block the first screen name individually from sending subsequent instant messages to the first user, and in response, the instant messaging server system configuring itself to block subsequent instant messages from the first screen name addressed to the first user; the instant messaging server system receiving a second blocking request from the second user to block the second screen name individually from sending subsequent instant messages to the second user, and in response, the instant messaging server system configuring itself to block subsequent instant messages from the second screen name addressed to the second user; and the instant messaging system server correlating the first, second and third screen names to the e-mail address by checking a prior registration of the first, second and third screen names by a fourth user using the e-mail address, and subsequently determining that a predetermined amount of users of the instant messaging server system have sent blocking requests for any individual screen name correlated to the e-mail address, and in response, the instant messaging server system configuring itself to block subsequent instant messages from the first, second and third screen names addressed to the first, second and third users and other users of the instant messaging server system regardless of whether the first user has sent a blocking request for the second or third screen name, the second user has sent a blocking request for the first or third screen name, and the third user and other users have sent a blocking request for the first, second or third screen name.

2. The method of claim 1 wherein the predetermined amount of users is a predetermined percentage of registrants of the instant messaging system server.

3. The method of claim 1 wherein the predetermined amount of users is tallied over a predetermined amount of time to form a rate at which different users block the first, second and third screen names individually.

4. An instant messaging server system for blocking first, second and third different screen names, correlated to a same e-mail address, from sending subsequent instant messages via the instant messaging server system, the instant messaging server system comprising: a CPU, a computer readable memory and a computer readable storage media; first program instructions to receive first, second and third instant messages from the first, second and third screen names addressed to first, second and third respective users of the instant messaging server system; second program instructions to receive a first blocking request from the first user to block the first screen name individually from sending subsequent instant messages to the first user, and in response, configure the instant messaging server system to block subsequent instant messages from the first screen name addressed to the first user, and receive a second blocking request from the second user to block the second screen name individually from sending subsequent instant messages to the second user, and in response, configure the instant messaging server system to block subsequent instant messages from the second screen name addressed to the second user; and third program instructions to correlate the first, second and third screen names to the e-mail address by checking a prior registration of the first, second and third screen names by a fourth user using the e-mail address, and subsequently determine that a predetermined amount of users of the instant messaging server system have sent blocking requests for any individual screen name correlated to the e-mail address, and in response, configure the instant messaging server system to block subsequent instant messages from the first, second and third screen names addressed to the first, second and third users and other users of the instant messaging server system regardless of whether the first user has sent a blocking request for the second or third screen name, the second user has sent a blocking request for the first or third screen name, and the third user and other users have sent a blocking request for the first, second or third screen name; and wherein the first, second and third program instructions are stored on the computer readable storage media for execution by the CPU via the computer readable memory.

5. The instant messaging server system of claim 4 wherein the predetermined amount of users is a predetermined percentage of registrants of the instant messaging system server.

6. The instant messaging server system of claim 4 wherein the predetermined amount of users is tallied over a predetermined amount of time to form a rate at which different users block the first, second and third screen names individually.

7. A computer program product for execution in an instant messaging server system to block first, second and third different screen names, correlated to a same e-mail address, from sending subsequent instant messages via the instant messaging server system, the computer program product comprising: a computer readable storage media; first program instructions to receive first, second and third instant messages from the first, second and third screen names addressed to first, second and third respective users of the instant messaging server system; second program instructions to receive a first blocking request from the first user to block the first screen name individually from sending subsequent instant messages to the first user, and in response, configure the instant messaging server system to block subsequent instant messages from the first screen name addressed to the first user, and receive a second blocking request from the second user to block the second screen name individually from sending subsequent instant messages to the second user, and in response, configure the instant messaging server system to block subsequent instant messages from the second screen name addressed to the second user; and third program instructions to correlate the first, second and third screen names to the e-mail address by checking a prior registration of the first, second and third screen names by a fourth user using the e-mail address, and subsequently determine that a predetermined amount of users of the instant messaging server system have sent blocking requests for any individual screen name correlated to the e-mail address, and in response, configure the instant messaging server system to block subsequent instant messages from the first, second and third screen names addressed to the first, second and third users and other users of the instant messaging server system regardless of whether the first user has sent a blocking request for the second or third screen name, the second user has sent a blocking request for the first or third screen name, and the third user and other users have sent a blocking request for the first, second or third screen name; and wherein the first, second and third program instructions are stored on the computer readable storage media.

8. The computer program product of claim 7 wherein the predetermined amount of users is a predetermined percentage of registrants of the instant messaging system server.

9. The computer program product of claim 7 wherein the predetermined amount of users is tallied over a predetermined amount of time to form a rate at which different users block the first, second and third screen names individually.

\* \* \* \* \*